(12) United States Patent
Bosisio et al.

(10) Patent No.: US 6,828,031 B2
(45) Date of Patent: Dec. 7, 2004

(54) METHOD OF FIXING A FIBER OPTIC COMPONENT IN AN OPTICAL DEVICE THE OPTICAL DEVICE SO OBTAINED AND THE POLYMER COMPOSITION USED THEREIN

(75) Inventors: Claudio Bosisio, Brembate (IT); Giovanni DelRosso, Sologno di Caltignaga (IT); Marco De Donno, Pavia (IT); Danilo Scarano, Turin (IT)

(73) Assignee: Corning Incorporated, Corning, NY (US)

( * ) Notice: Subject to any disclaimer, the term of this patent is extended or adjusted under 35 U.S.C. 154(b) by 15 days.

(21) Appl. No.: 10/148,366

(22) PCT Filed: Nov. 29, 2000

(86) PCT No.: PCT/EP00/11936

§ 371 (c)(1),
(2), (4) Date: Sep. 16, 2002

(87) PCT Pub. No.: WO01/40379

PCT Pub. Date: Jun. 7, 2001

(65) Prior Publication Data

US 2003/0072553 A1 Apr. 17, 2003

Related U.S. Application Data

(60) Provisional application No. 60/168,633, filed on Dec. 3, 1999.

(30) Foreign Application Priority Data

Nov. 30, 1999 (EP) .............................................. 99123718

(51) Int. Cl.[7] ............................................... B32B 25/20
(52) U.S. Cl. .......................... 428/447; 528/12; 528/31; 528/32; 525/477; 525/478; 524/588
(58) Field of Search .............................. 528/12, 31, 32; 525/477, 478; 524/588; 428/477

(56) References Cited

U.S. PATENT DOCUMENTS

| 4,868,251 A | * | 9/1989 | Reich et al. |
| 4,990,560 A | * | 2/1991 | Ikeno et al. |
| 5,320,904 A | | 6/1994 | Mitchell |
| 5,727,105 A | | 3/1998 | Nagata et al. |
| 5,887,107 A | | 3/1999 | Newman et al. |
| 5,915,061 A | | 6/1999 | Vanoli |
| 5,960,143 A | | 9/1999 | Dannoux et al. |

FOREIGN PATENT DOCUMENTS

| EP | 0182538 | 11/1985 |
| EP | 0240162 | 3/1987 |
| EP | 0699717 | 8/1995 |

OTHER PUBLICATIONS

J. Burkhardt; "Silicones Chemistry and Technology"; Apr. 18, 1989; pp. 21–73.
Turan Erdogen; "Fiber Grating Spectra"; Journal of Lightwave Technology, vol. 15, No. 8, Aug. 1997; pp. 1277–1294.

* cited by examiner

*Primary Examiner*—Kuo-Liang Peng
(74) *Attorney, Agent, or Firm*—Walter M. Douglas

(57) ABSTRACT

An optical device is described comprising at least one fiber-optic component arrange inside said device and a particular polymer composition capable of holding said optical component(s) in a predetermined position and protecting them inside said device. The polymer composition is a silicone elastomer obtained by crosslinking a mixture comprising at least one polysiloxane containing two or more hydrogen-siloxane functional groups of formula >SiH—O—, and at least one polysiloxane containing at least two vinyl groups of formula —CH=H$_2$, where said polysiloxane are reacted in an amount such that the molar ratio between the hydrogen-siloxane groups and the vinyl groups is less than or equal to 1:1. The polymer composition has extremely low emission of hydrogen, less than 1 cm$^3$ per kg of composition.

11 Claims, 3 Drawing Sheets

METHOD OF FIXING A FIBER OPTIC COMPONENT IN AN OPTICAL DEVICE THE OPTICAL DEVICE SO OBTAINED AND THE POLYMER COMPOSITION USED THEREIN

This application claims the benefit of Provisional Application No. 60/168,633, filed Dec. 3, 1999.

FIELD OF THE INVENTION

The present invention relates to a method of fixing, and in particular of assembling and encasing, a fiber-optic component inside a device by means of a polymer composition. The present invention further relates to an optical device comprising at least one fiber-optic component arranged inside said device and in particular a polymer composition capable of holding in a predetermined position and protecting said optical components inside said device. In addition the present invention relates to said polymer composition.

BACKGROUND OF THE INVENTION

For the purposes of the present invention, fiber-optic component means one or more optical fibers connected optically in some way, possessing characteristics (for example dimensions, constituent materials or dopants, types of covering, mutual position of the fibers, values of the refractive index of the core and of the outermost layers, etc.) chosen in such a way as to transmit an input optical beam into at least one output optical beam in accordance with a predetermined transfer function.

Examples of fiber-optic components are: fiber Bragg gratings (fibre gratings), active fibers used for the amplification of optical signals, fiber couplers, optical fibers in general (for example single-mode fibers, multimode fibers, polarization-maintaining fibers, dispersion-compensating fibers, dispersion-shifted fibres, fibers used in optical sensors, etc.) as well as components obtained by combining them.

Fibre gratings ("gratings" for short) are generally optical fibers that have, in one portion, a refractive index of the core n and/or of the cladding $n_c$ permanently modulated along the fiber's propagation axis. Gratings reflect, according to various transfer functions, optical signals that have different wavelengths.

When the refractive index of the core n assumes a periodic variation (for example sinusoidal) with amplitude and pitch Λ constant along the fiber's propagation axis, the grating is called uniform.

Apodized gratings have an amplitude of the refractive index of the core n that varies along the fiber's propagation axis (for example according to a Gaussian profile), whereas chirped gratings have a pitch Λ that varies along the fibre's propagation axis.

In an article "Fiber Grating Spectra", Journal of Light Technology, Vol. 15, No. 8, p. 1277–1294, August 1997, T. Erdogan describes various types of fiber gratings and presents theoretical principles for their design and their possible uses in the field of optical telecommunications. The types of gratings considered by the author include, among others, the aforementioned uniform gratings, apodized gratings and chirped gratings.

Fibre components and in general optical devices that comprise fiber components, for example devices for chromatic dispersion, are normally housed in units that protect the component and/or the device and limit their overall dimensions, permitting them to be transported.

Devices for compensating chromatic dispersion, for example of the type comprising an optical circulator and a DCG, are housed in suitable modules such as those produced by the applicant and designated by the abbreviation CDCM (Chromatic Dispersion Compensation Module), for example models CDC 0480, and CDC 016160.

For example, U.S. Pat. No. 5,887,107 describes an optical device consisting of a container, and an optical fiber containing, in one portion thereof, a Bragg grating. The container is moreover provided with a locking element, which constrains a portion of the fiber, and a mandrel around which another portion of the fiber is wound.

An organizer rack for the housing of fiber-optic components, electrical, electro-optical and optical components variously connected, is illustrated in U.S. Pat. No. 5,915,061 in the name of the same applicant. This document describes an optoelectronic apparatus that comprises a casing, inside which are arranged an electronic unit and an optical unit, connected electrically to each other; the optical unit comprises an element on which at least one component is housed, which may be of the optical type, with optical connection or of the electro-optical type. The use of filling materials or adhesives inside known optical devices is also known.

For example, U.S. Pat. No. 5,727,105 describes a device comprising a main container and two side containers, with an optical fiber that is introduced from the side container to the main container. The optical fiber is locked in the side container by means of a silicone resin or an epoxy adhesive.

Moreover, U.S. Pat. No. 5,960,143, which relates to a protective casing of an optical component, describes the use of an adhesive product for fixing an optical fiber to a waveguide and for mechanically fixing an optical fiber to a substrate. This patent also describes the use of a water-repellent lubricant, for example of the so-called mechanical type or silicone-based, for separating the optical component from the container walls.

The preparation of room temperature vulcanizable (RTV) and high-temperature vulcanizable (HTV) silicone elastomers (or rubbers) is described in the reference book "Silicones—Chemistry and Technology" s.v., published by Vulkan-Verlag Essen (DE), 1991, p. 45–59. The RTV silicone rubbers are divided into single-component silicone rubbers (RTV-1) and two-component silicone rubbers (RTV-2). The latter, as stated in the book cited above, can be produced by a condensation reaction between two silicone compounds (for example between a polymethyldisiloxane with —OH end groups and a tetra-ester of silicic acid) or by an addition reaction between two silicone compounds (for example by a reaction of hydrosilation of a silicone compound containing ≡SiH groups along the chain with a polydimethylsiloxane containing vinyl groups, either terminal or pendent along the chain).

SUMMARY OF THE INVENTION

A first aspect of the present invention relates to a method of fixing an optical component arranged inside a housing, comprising the steps of:
  arranging said optical component inside said housing;
  embedding said optical component in a polymer composition based on polysiloxanes;
  crosslinking said polymer composition, to obtain a crosslinked silicone elastomer capable of fixing said component;
wherein said composition can be crosslinked by an addition reaction and that said silicone elastomer evolves a quantity of hydrogen less than about 1 cm³/kg of elastomer, when submitted to thermal ageing for 15 days at 100° C.

Another aspect of the present invention relates to an optical device comprising at least one fiber-optic component;
a housing capable of containing said fiber-optic component; and
a polymer composition capable of holding said optical component in a predetermined position inside said housing and of protecting said component from mechanical stresses;

wherein said polymer composition comprises a silicone rubber crosslinked by an addition reaction, said rubber evolving a quantity of hydrogen of less than about 1 cm³/kg of rubber as a result of thermal ageing for 15 days at 100° C. Preferably, the quantity of hydrogen evolved is less than about 0.1 cm³/kg. Yet another aspect of the invention describes the polymer composition used in practising the invention.

BRIEF DESCRIPTION OF THE DRAWINGS

The characteristics and advantages of the invention will be illustrated below with reference to embodiments represented by way of example in the appended drawings.

DETAILED DESCRIPTION OF THE INVENTION

Figure 1:
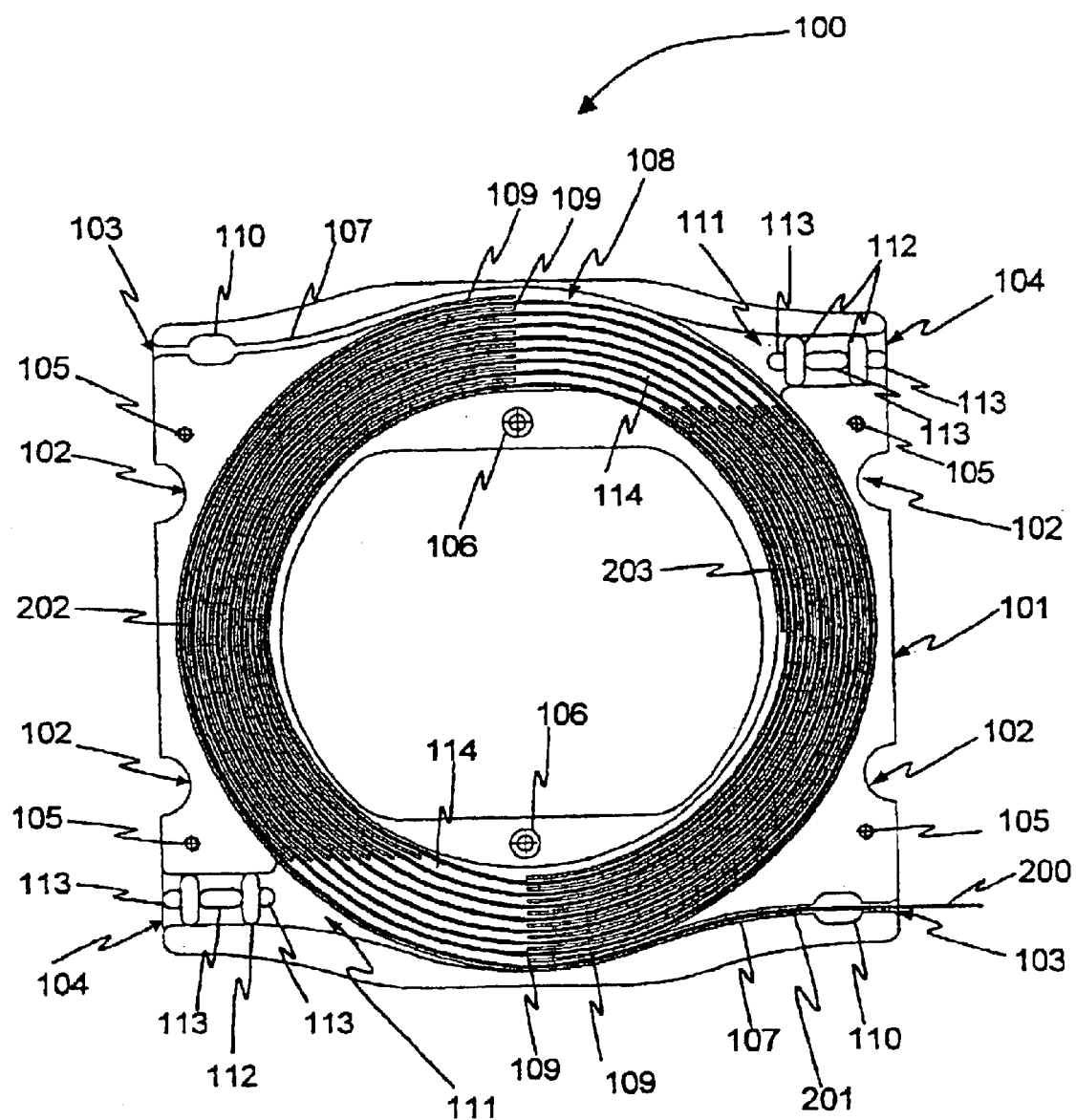
FIG. 1 shows a plan view of an optical device according to the invention.

The applicant has observed that for the purposes of the present invention, the RTV-2 silicone rubbers obtained by an addition reaction (hereinafter abbreviated to "RTV-2A"), as described in "Silicones—Chemistry and Technology" cited above, prove to be particularly advantageous relative to the RTV-1 rubbers and to the RTV-2 rubbers obtained by condensation (hereinafter abbreviated to "RTV-2C"). For example, in contrast to the RTV-1 rubbers and the RTV-2C rubbers, the RTV-2A rubbers exhibit volumetric shrinkage, as a result of crosslinking of the two-component mixture, generally of less than 0.1%. This limited shrinkage of the material makes it possible to fix the optical components securely in the desired position, without any possibility that they might be subject to even slight accidental displacements on account of substantial shrinkage of the fixing material as a result of crosslinking of said material. Another disadvantage of the RTV-1 and RTV-2C rubbers is connected with the fact that the crosslinking reactions of these resins produce reaction by-products (liquid or gaseous), which are released more or less slowly from the bulk of the crosslinked rubber or in the crosslinking step. Typical by-products of the crosslinking of RTV-1 and RTV-2C rubbers are water, alcohols (for example methanol, ethanol), carboxylic acids (for example acetic acid), aldehydes (for example acetaldehyde), ketones (for example acetone), amides (for example N-methylacetamide) or amines (for example dimethyl- or diethyl-amine). These reaction by-products, if they are not removed properly and completely from the crosslinked mass of the fixing material, can contribute to alteration of the optical behaviour of the optical component (water, alcohols) as well as damaging other parts of the optical device (for example corrosion by acids). Furthermore, the RTV-1 silicone rubbers require the humidity of the air for crosslinking and the reaction of crosslinking of the material depends on the thickness of material to be crosslinked. In fact, in the case when the silicone layer has a single surface of contact with the atmosphere, crosslinking of the interior of said layer takes place with a certain delay and some difficulty relative to the outermost surface. In particular, proper crosslinking of a layer of RTV-1 silicone rubber that has a single surface of contact with the atmosphere and a thickness of about a centimetre or more proves to be extremely difficult.

For the purposes of the present description, and according to the normal meaning of the term, the term addition reaction of a two-component silicone rubber therefore means that the stoichiometry of the crosslinking reaction between the two components for forming the rubber is such that formation of reaction by-products does not occur, in contrast to what happens in the formation of the RTV-1 and RTV-2 silicone rubbers. A two-component silicone rubber obtained by an addition reaction will therefore be free from reaction by-products directly derived from the stoichiometry of the reaction.

With reference to the aforementioned addition reaction of the RTV-2 silicone rubbers, as stated on page 65 of said book, for optimum cure of the elastomer it is necessary that the reaction of hydrosilation should be carried out with a stoichiometric excess of from 1.5 to 2 times of ≡SiH groups relative to the vinyl groups.

The applicant has now observed that as fiber-optic components are particularly sensitive to the presence of hydrogen (diffusion of hydrogen into these optical components is in fact recognized as one of the causes of attenuation of the signal transmitted by these components), it is necessary that the material used for fixing/protection of these components should not evolve hydrogen, or evolve negligible amounts thereof. The applicant has observed in particular that in an optical device, comprising an optical component and a material for fixing said component arranged in a substantially hermetic container, said fixing material should not evolve quantities greater than about 100 ppm of hydrogen (referred to the volume of the hermetic container) for the working life of the device, to avoid undesirable attenuation of the signal being transmitted. Substantially hermetic container means a container with a finite volume, isolated from the outside by sealing the openings with means possessing reduced permeability to gases (for example adhesives, gaskets, O-rings), within which any gases (e.g. hydrogen) evolved from the materials contained in said container are not released instantly to the surroundings, but initially remain trapped in said container but are eventually released over time as a result of permeation through the sealed openings. For example, if the device inside which the fiber-optic component is housed is a hermetic container with volume of about 100 cm³, employing a quantity by weight of about 10 g of the fixing material, said material should not evolve a quantity of hydrogen greater than about 1.0 cm³ per kg of material, said quantity preferably being less than about 0.5 cm³ per kg of material. In this connection, the applicant has observed that if the addition reaction for making the silicone rubber is carried out in accordance with the state of the art, i.e. using a stoichiometric excess of ≡SiH groups relative to the vinyl groups, the presence of unreacted hydrogen-siloxane compounds (i.e. containing ≡SiH groups) in the final rubber can give rise to the formation of hydrogen as a result of decomposition of said compounds by reaction with water. The amount of hydrogen evolved is greater for larger excess of hydrogen-siloxane compounds used. For example, with a molar ratio of 1.5:1 of ≡SiH groups relative to vinyl groups, the applicant has observed evolution of hydrogen from 100 cm³/kg of silicone rubber, up to more than 300 cm³/kg of silicone rubber.

In addition the applicant has observed that, during its use, the component can be displaced relative to the position in which it was initially placed in the housing unit, for example during handling of the optical device or as a result of thermal fluctuations of a certain extent, so that successive portions of said component, initially apart, can come into contact if not adequately fixed. In the case when the relative pressure between the two contacting surfaces is of a certain magnitude, this pressure can produce non-negligible mechanical stresses at the points of contact of said component portions, with consequent change in optical behaviour of said component. Accordingly, the optical behaviour of the fiber-optic component changes during the lifetime of said component.

The applicant has therefore observed that particular attention must be paid to the type of material used for protecting said optical components and holding them in the original position. In particular, the applicant has observed that, because of the reduced dimensions of the housings within which the optical components are placed, the fixing material must possess, at the time of application, a sufficiently low viscosity, so that it can be applied relatively easily inside said housings. On the other hand, once applied, the material must guarantee adequate locking of the optical component in the associated housings, for which it is desirable that its viscosity should be quite high. In particular, for certain guarantee of said locking, it is preferable for said material to have a solid consistency. Preferably, said solid material is moreover easily tearable, to permit easy and complete removal of said material from the optical component, in the eventuality that access is again required to the optical component inside the device. However, the applicant has observed that the hardness of said material should not be excessively high, so that any mechanical stresses are transmitted to a reduced extent, if at all, to the protected optical component.

Finally, the applicant has observed that another measure by which the optical behaviour of an optical component housed inside an optical device can be kept substantially constant comprises arranging said optical component in an orderly fashion inside said device, in particular avoiding contact between successive portions of said optical component, and fixing said component with a material according to the present invention.

Thus, the present invention relates to an optical device, and a method of making said device, inside which a fiber-optic component and a fixing material are placed, said material being capable of holding said component in a stable manner in a predetermined position without altering the transmission properties of said component. In the case of an optical component of greater length than the device inside which said optical component is housed, the optical component is preferably wound up so as to give it a position that prevents contacts through direct superposition, in particular any type of contact at all, between different portions of the windings. According to the present invention, the fixing material is a silicone elastomer that meets in particular the requirements of: reduced emission of hydrogen, easy application and reduced crosslinking time, resulting in a final material that is sufficiently soft, so as to permit efficient locking of the fiber component without compromising its optical behaviour. The present invention further relates to a method of assembling and encasing said fiber-optic components and said polymer composition inside said optical device.

For the purposes of the present invention, the term winding of a fiber-optic component means a portion of said component having a curved shape, i.e. not rectilinear, over a substantial part of its length and preferably arranged in an open manner, i.e. in such a way that there is no contact between different points of the same winding.

For the purposes of the present invention, the expression "fiber-optic component arranged in a wound configuration" means that the fiber-optic component is arranged as a plurality of windings.

A first aspect of the present invention relates to a method of fixing an optical component arranged inside a housing, comprising the steps of:

arranging said optical component inside said housing;

embedding said optical component in a polymer composition based on polysiloxanes;

crosslinking said polymer composition, to obtain a crosslinked silicone elastomer capable of fixing said component;

characterized in that said composition can be crosslinked by an addition reaction and that said silicone elastomer evolves a quantity of hydrogen less than about 1 cm³/kg of elastomer, when submitted to thermal ageing for 15 days at 100° C.

Another aspect of the present invention relates to an optical device comprising at least one fiber-optic component;

a housing capable of containing said fiber-optic component; and a polymer composition capable of holding said optical component in a predetermined position inside said housing and of protecting said component from mechanical stresses;

characterized in that said polymer composition comprises a silicone rubber crosslinked by an addition reaction, said rubber evolving a quantity of hydrogen of less than about 1 cm³/kg of rubber as a result of thermal ageing for 15 days at 100° C. Preferably, said quantity of hydrogen evolved is less than about 0.1 cm³/kg.

According to a preferred embodiment, said silicone rubber has a needle penetration value according to standard ASTM D1321 between about 300 tenths of mm and about 600 tenths of mm, and preferably between about 400 tenths of mm and about 500 tenths of mm.

According to another preferred embodiment, the viscosity of the polymer composition before crosslinking is between about 500 mPas and about 2000 mPas at 25° C.

Preferably, said composition is obtained by crosslinking of a mixture comprising:

at least one polysiloxane containing at least two hydrogen-siloxane functional groups of formula >SiH—O—; and at least one polysiloxane containing at least two vinyl groups of formula —CH=CH$_2$;

a catalyst;

said polysiloxanes being reacted in an amount such that the molar ratio between the hydrogen-siloxane groups and the vinyl groups is less than or equal to 1:1.

According to a preferred embodiment, said optical component is arranged as a plurality of adjacent windings inside said housing. Preferably, said housing is rigid and comprises at least one separator element capable of physically separating said plurality of windings from one another so as to avoid contacts through their superposition.

A further aspect of the present invention relates to an elastomeric composition based on polysiloxane obtained by crosslinking a mixture comprising:

at least one polysiloxane containing two or more hydrogen-siloxane functional groups of formula >SiH—O—; and at least one polysiloxane containing at least two vinyl groups of formula —CH=CH$_2$;

a catalyst;

characterized in that said polysiloxanes are reacted in an amount such that the molar ratio between the hydrogen-siloxane groups and the vinyl groups is less than or equal to 1:1.

Preferably, the ratio between the molar quantity of hydrogen-siloxane groups and the molar quantity of vinyl groups is between about 1:1 and about 0.5:1.

According to a preferred embodiment, the polysiloxane containing hydrogen-siloxane groups is a compound of formula (I):

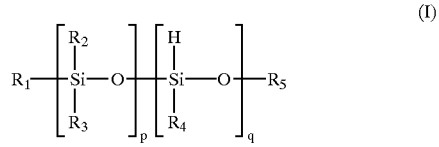

where $R_1$, $R_2$, $R_3$, R4, and $R_5$ are, each independently, a ($C_1$–$C_4$) alkyl group, a ($C_5$–$C_8$) cycloalkyl group or a phenyl group, p is an integer between about 30 and about 200 and q is an integer between about 5 and about 40. Preferably, the ratio between units of type —HSiR$_4$—O— and units of type —Si(R$_2$R$_3$)—O— of the compound of formula I is between about 1:1 and about 1:10. Preferably, the quantity of ≡SiH groups is between about 1 mmol per gram of compound and about 10 mmol per gram of compound.

According to another preferred embodiment, the aforementioned polysiloxane containing vinyl groups is a compound of formula (II)

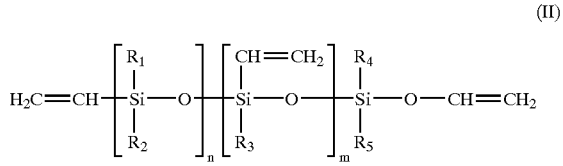

where $R_1$, $R_2$, $R_3$, $R_4$, and $R_5$ are, each independently, a ($C_1$–$C_4$) alkyl group, a ($C_5$–$C_8$) cycloalkyl group or a phenyl group, n is an integer between about 200 and about 1200 and m is zero or an integer between 1 and 5.

Preferably, said elastomeric composition contains in addition a silicone oil, preferably in a quantity between about 30% and about 60% by weight relative to the total weight of the composition.

Advantageously, said elastomeric composition can in addition contain silica, preferably in a quantity between 5% and 20% by weight relative to the total weight of the composition.

Another aspect of the present invention relates to the use of an elastomeric composition as described above for fixing of an optical component. The present invention therefore makes the operation of placing the fiber-optic component in the associated housing unit less critical. In addition, it makes it possible to obtain reliable optical devices, which have an effective transfer characteristic that is substantially equal to the nominal value, reducing the operations of characterization and inspection that have to be effected on the device during its life.

The optical device according to the invention can be combined advantageously with other optical or optoelectronic devices and can be used as a discrete component, independently of the components to which it is connected.

DETAILED DESCRIPTION OF THE INVENTION

As stated previously, one aspect of the present invention relates to an optical device comprising at least one fiber-optic component, placed inside a housing and held in a predetermined position inside said housing by means of a particular polymer composition, said polymer composition possessing particular mechanical and chemical properties, as well as advantageous application characteristics.

According to a first aspect, a silicone composition according to the present invention is characterized in that when it is submitted to thermal ageing for 15 days at 100° C. it evolves a quantity of hydrogen less than 1 cm$^3$ per kg of silicone rubber. Preferably, said quantity is less than about 0.5 cm$^3$/kg, and even more preferably less than about 0.1 cm$^3$/kg of crosslinked material. Those silicone rubbers according to the invention that evolve a quantity of hydrogen less than about 0.05 cm$^3$/kg of material are particularly advantageous.

These characteristics can be obtained by suitably controlling the stoichiometric ratios of the hydrogen-siloxane and vinyl-siloxane compounds used in the reaction of hydrosilation to obtain said rubber, in particular carrying out the reaction with a stoichiometric ratio of 1:1 between the ≡SiH and vinyl functional groups, or with a stoichiometric deficit of ≡SiH groups.

As mentioned previously, the applicant has in fact observed that if the aforementioned reaction of hydrosilation is carried out in the manner suggested by the state of the art for optimizing the physical properties of the resins, i.e. with a stoichiometric excess from 1.5 to 2 times, of groups relative to the vinyl groups, the presence of the excess of unreacted hydrogen-siloxane compound in the silicone mass can give rise to the formation of hydrogen through reaction of the excess hydrogen-siloxane groups with water, according to the reaction scheme:

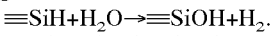

Figure 3:
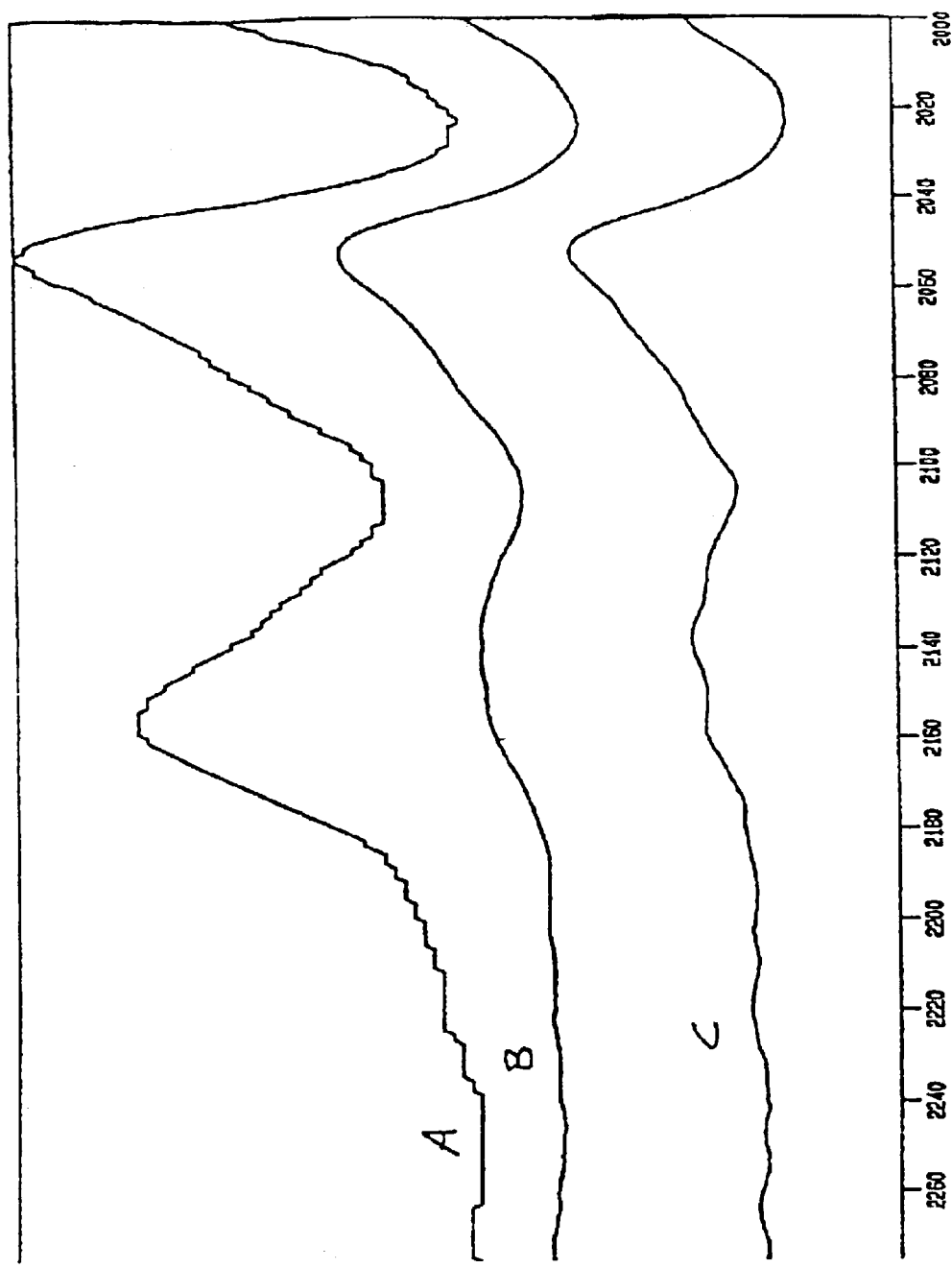
FIG. 3 shows an analysis by FTIR (Fourier transform infrared spectroscopy) of the crosslinking of a silicone rubber according to the invention.

On the other hand, substantially complete reaction of the ≡SiOH groups makes it possible to obtain a rubber that is substantially free from said unreacted hydrogen-siloxane compounds, thus avoiding the detrimental possible formation of hydrogen as a result of their decomposition through reaction with water, FIG. 3 shows the progress of crosslinking of a silicone rubber where the ratio between ≡SiH groups and vinyl groups of the polysiloxane reactants is about 1:1 (prepared according to Example 2 described below). This graph shows analysis by FTIR spectroscopy of the various steps of crosslinking of the resin, starting from mixing of the components (line "A"), with particular reference to IR absorption of the band at 2155 cm$^{-1}$ relating to the ≡SiH group. As can be seen from the graph, this band decreases in intensity substantially just one hour after mixing the components (line "B"), and becomes practically negligible after about 4 hours (line "C").

The applicant has further observed that to generate less than 1 cm³ of hydrogen per kg of material, it is necessary for the final silicone rubber to contain a residue of unreacted ≡SiH groups of less than 0.045 mmol per kg of material. An elastomer according to the present invention can therefore be obtained by means of a reaction of addition crosslinking (addition curing) of a polysiloxane, preferably a polydimethylsiloxane, containing at least two hydrogen-siloxane functional groups of formula >SiH—O— ("hydrogen-siloxane" for short) with a polysiloxane, preferably a polydimethylsiloxane, containing at least two vinyl groups of formula —CH=CH₂ ("vinyl-siloxane" for short), the ratio between the molar quantity of hydrogen-siloxane groups and the molar quantity of vinyl groups being less than or equal to 1:1. In particular, the ratio between the molar quantity of hydrogen-siloxane groups and the molar quantity of vinyl groups is between about 1:1 and about 0.5:1, preferably between about 0.9:1 and about 0.7:1, with a ratio of about 0.8:1 being particularly preferred.

Said crosslinking reaction is preferably carried out at room temperature.

As polysiloxane containing hydrogen-siloxane groups, a compound of formula (I) can be employed advantageously for the purposes of the present invention:

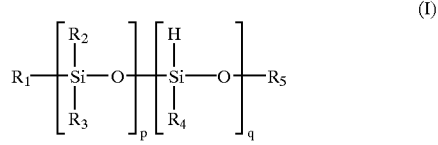

(I)

where $R_1$, $R_2$, $R_3$, $R_4$, and $R_5$ are, each independently, a ($C_1$–$C_4$) alkyl group, a ($C_5$–$C_8$) cycloalkyl group or a phenyl group, preferably a methyl group, p is an integer between about 30 and about 200, preferably between about 50 and about 120 and q is an integer between about 5 and about 40, preferably between about 10 and about 25. Preferably, the ratio between units of the type —HSiR₄—O— and units of the type —Si(R₂R₃)—O— is between about 1:1 and about 1:10, and is preferably between about 1:3 and about 1:5. Preferably, the quantity of ≡SiH groups is between about 1 mmol per gram of compound and about 10 mmol per gram of compound of formula (I).

Advantageously, a polysiloxane containing hydrogen-siloxane groups according to the present invention, and in particular a compound of formula (I) where $R_1$, $R_2$, $R_3$, $R_4$, and $R_5$ are methyl, has a kinematic viscosity (at 25° C.) between about 10 and about 600 mPas, preferably between 20 mPas and 400 mPas, a viscosity of about 25 and 250 mPas (measured according to standard ASTM 445) being particularly preferred.

Examples of polysiloxane compounds containing hydrogen-siloxane groups that can be used in the present composition are marketed with the trade names Silopren U130, Silopren U230, Silopren U430, Silopren U930 (Bayer AG), PS122.5, PS123, PS123.5, PS123.8, PS124.5, PS125, PS125.5, PS129.5 (United Chemical Technologies).

Among the vinyl-terminated polysiloxane compounds, compounds of formula (II) can be employed advantageously for the purposes of the present invention:

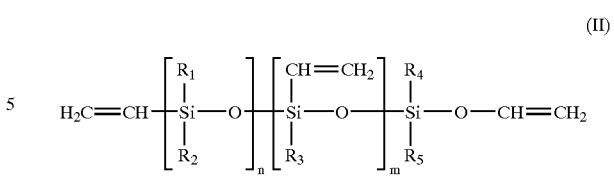

(II)

where $R_1$, $R_2$, $R_3$, $R_4$, and $R_5$ are, each independently, a ($C_1$–$C_4$) alkyl group, a ($C_5$–$C_8$) cycloalkyl group or a phenyl group, preferably a methyl group, n is an integer between about 200 and about 1200, preferably between about 300 and about 1000, and m is zero or an integer between 1 and 5, and is preferably 0, 1 or 2.

The kinematic viscosity (at 20° C.) of a polyvinylsiloxane according to the invention, and in particular a compound of formula (II) where $R_1$, $R_2$, $R_3$, $R_4$, and $R_5$ are methyl (polydimethylsiloxane containing vinyl groups), is preferably between about 100 mPas and about 65,000 mPas, preferably between about 800 and about 12,000 mPas (ASTM D445). For the purposes of the present invention, it is possible to use either a single compound with predetermined viscosity, for example of about 5000 mPas, or a mixture of two or more compounds with different viscosities to obtain a viscosity that is intermediate between those of the different compounds (for example a viscosity of about 5000 mPas can be obtained by mixing, in suitable amounts, a compound with viscosity of about 1000 mPas and a compound with viscosity of about 10,000 mPas).

Examples of polydimethylsiloxane compounds containing vinyl groups that can be employed in the present composition are marketed with the trade names Silopren U1, Silopren U5, Silopren U10, Silopren U65 (Bayer AG), PS441, PS441.2, PS442, PS443, PS444, PS445, PS447.6, PS463, PS491, PS493, PS735 (United Chemical Technologies).

The aforementioned addition curing reaction can typically be effected in the presence of a metallic catalyst, which is added to the compounds to be crosslinked, preferably in the form of a soluble salt or organometallic complex. The quantities are about 5–10 ppm of metal relative to the total weight of the composition. The metal is preferably selected from the transition metals, for example rhodium or, more preferably, platinum, preferably in the form of a soluble salt. Examples of catalysts that can be used for the aforementioned reaction are marketed by the company United Chemical Technologies with the names PC072, PC073, PC074, PC075, PC075.5 and PC076.

The silicone composition according to the present invention can moreover advantageously contain silicone oils, with the aim of modifying either the viscosity of the mixture to be crosslinked or the mechanical properties of the final elastomer. In particular, whereas on the one hand the addition of said oils may alter the viscosity of the mixture to be crosslinked, making its application easier, on the other hand the presence of these oils (which do not take part in the crosslinking reaction) in the final rubber helps to control the final softness of the material, which is to be such that it does not transmit (or transmits to a negligible extent) undesirable mechanical stresses on the optical components embedded in said material. The kinematic viscosity of these oils is preferably between about 20 mPas and about 2000 mPas at 25° C. (ASTM D445), with a viscosity between about 100 mPas and about 1000 mPas being mostly preferred. In order to obtain the desired viscosity of the mixture to be crosslinked and the desired characteristics of softness of the final elastomer, the aforementioned oils can be used either individually or as a mixture of several oils with different viscosities. Typically, the quantity of silicone oil in the final composition can vary from about 30% to about 60% by weight, depending on the viscosity required for the mixture to be crosslinked and on the desired characteristics of softness of the final resin.

Silicone oils favourably used for the purposes of the present invention are α-ω-trimethylsiloxy-polydimethylsiloxanes of general formula (III):

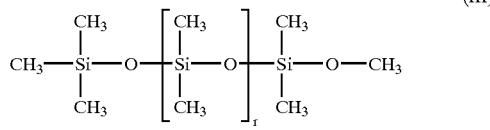

(III)

where r is an integer between about 30 and about 500, preferably between about 100 and about 400.

Examples of silicone oils that can be used in the present composition are marketed with the trade names Baysilone M100, Baysilone M500, Baysilone M1000 (Bayer AG), DC 200/20, DC 200/500, DC 200/1000 (Dow Corning), AK100, AK500, AK1000 (Wacker).

A composition according to the present invention can in addition contain silica, typically in a quantity between about 5% and about 20% by weight. Partially silanized pyrogenic silica can be used advantageously in the form of submicroscopic particles (submicroscopic fire-dry fumed silica) with particle sizes of about 0.007–0.01 µm. Examples of commercially available silica comprise silica Cab-O-Sil TS610 (Cabot), silica HDK H15, HDK H20, HDK H30 (Wacker). The presence of silica in the composition has the dual purpose of imparting thickening of the thixotropic type to the liquid mixture during the application steps (decrease in viscosity when the mixture is subjected to shear stresses, increase in viscosity when the mixture is at rest) and to endow the final material with improved mechanical properties.

For practical application, the vinyl component of the mixture to be crosslinked is generally kept separate from the hydrogen-siloxane component until the moment of application.

For this purpose, two separate mixtures each containing the aforementioned components, mixed with other suitable additives, can favourably be prepared. The two-component silicone rubber can then be obtained by mixing a part A and a part B in suitable proportions. A typical example of composition of the parts (or components) A and B is as follows:

Part A: comprising one or more vinyl-siloxane compounds, a catalyst, optionally a silicone oil (or mixture of several silicone oils) to achieve the desired application viscosity and, optionally, a suitable amount of silica; and Part B: comprising one or more hydrogen-siloxane crosslinking agents, optionally a silicone oil (or mixture of oils) and optionally a suitable amount of silica.

According to an alternative embodiment, part B can in addition contain a certain quantity of vinyl-siloxane compound.

Part A and part B are then mixed together in the appropriate proportions at the moment of application of the material.

Since, for the specific application, it is necessary that the elastomeric composition should be able to be inserted in housings of relatively small dimensions, it is preferable that the application mixture (Part A+Part B) should have a fairly low kinematic viscosity, preferably below about 2000 mPas at 20° C., though, at least for some applications, sufficiently high, for example above about 500 mPas, to avoid excessive flow of the composition. A viscosity between about 800 mPas and about 1500 mPas is particularly preferred. The two parts of which the silicone rubber is composed according to the invention can preferably each have roughly the desired viscosity for the specific application, or said viscosity can be obtained on mixing the two parts, which will have, respectively, a higher viscosity and a lower viscosity than that desired, the final application viscosity being reached when the two parts are mixed according to the predetermined stoichiometric proportions. As stated previously, the desired viscosity of the mixture can be obtained advantageously by adding a sufficient quantity of silicone oil of an appropriate viscosity to the two parts of the mixture.

Once the two components of the silicone rubber are mixed, the resulting mixture is poured into the appropriate housings, as described below. The working life of the mixture, i.e. the useful period during which the mixture can be manipulated without appreciable increases in viscosity, varies from about 10 minutes to about 30, and is preferably about 15–20 minutes. Such a period of time is generally regarded as sufficient to enable the operator to place the mixture in the housings easily. After that period of time, as a result of progression of the crosslinking reaction between the components, the viscosity of the mixture becomes higher and higher, so that it can become difficult to place the material in the respective housings.

From the moment of mixing the two components, the material takes from about 30 minutes to about 2 hours, preferably 1–1.5 hours, to reach a hardness similar to the final hardness, for which the crosslinking reaction can be regarded as substantially completed. As stated previously, the rubber will nevertheless have to have a fairly low hardness, so as not to cause excessive mechanical stresses on the optical components embedded in it. The desired softness of a silicone rubber according to the invention can be obtained either by suitably varying the stoichiometric ratio of the reactants (reducing the amount of hydrogen-siloxane compound leads to a decrease in the degree of crosslinking of the elastomer and consequently its hardness), or by adding a suitable amount of silicone oils of appropriate viscosity to the mixture. Preferably, a silicone rubber according to the invention has a needle penetration value, measured according to standard ASTM D1321, between about 300 tenths of mm and about 600 tenths of mm, preferably between about 400 tenths of mm and about 500 tenths of mm.

Application of the liquid mixture and of the fiber-optic component inside an optical device for the purpose of embedding said component in the silicone material can be effected according to various assembly techniques. In all the cases described below, the liquid silicone mixture referred to is to be understood as the mixture of the two vinyl-siloxane and hydrogen-siloxane components, comprising catalyst and any other additives such as silicone oils or silica. As mentioned previously, this mixture has a sufficiently low viscosity, low enough, that is, to permit its easy application in the spaces of reduced dimensions of the optical device, though without being excessively fluid, to avoid excessive flow of the mixture inside said housings. Typically, the viscosity of the mixture applied is between about 500 mPas and about 2000 mPas, and is preferably between about 800 and 1200 mPas.

A first method of assembly of the optical device according to the invention comprises a first step of placing the fiber-optic component in a housing circuit, and a next step that comprises pouring the liquid silicone mixture onto said component, in a quantity such as to cover said component with a layer about 1–2 mm thick. Placing of the fiber-optic component is done with particular care, so as not to induce stresses in said component. A spiral profile of placement of the optical component, as illustrated for example in FIG. 1, may prove advantageous in that it guarantees minimum stress for the fiber-optic component. Once the silicone mixture has been placed inside the housing, the optical device is left open at room temperature for about 2 hours so as to reach the desired degree of cure of the rubber, and then it is closed. This method has the advantage that it permits easy recovery of the optical component before applying the silicone mixture, if said component should exhibit problems, for example because of its incorrect handling during the placement step.

A second method of assembly of the optical device according to the invention comprises, as the first step, a first pouring of a minimum quantity of silicone composition (for example a thickness of about 0.8 mm) on the bottom of the housing of the optical device. Then, once this first layer of silicone rubber has hardened, the fiber-optic component is placed in said housing. Then a second pouring of the liquid silicone mixture is effected, so as to completely embed the fibre-optic component. This second layer is then left to crosslink as described previously for the first method. The presence of the first layer of silicone rubber on the bottom of the housing permits slight adhesion of the optical component placed in said housing, thus reducing the risk of possible slipping of the component out of the housing, as might however occur in the first method.

A third method comprises a first step in which the silicone mixture is poured into the housing of the optical device. Immediately afterwards, the fiber-optic component is placed in said housing, taking care to embed it completely in the mixture that is still in the liquid state. In this third case as well, it is possible to exert better control during the step of placement of the optical component, preventing the latter from slipping inadvertently from the containment housing. Adopting one of the methods described above, the optical component is placed in the relevant housing with minimum stress, so as not to induce substantial changes of the transfer function of said component. In any event, any minimal changes of said transfer function are kept constant over time owing to the locking action of the silicone material on the optical component, thus ensuring constancy of optical behaviour of the component.

The elastomeric silicone material thus introduced into the housing circuit therefore constitutes a permanently soft contact surface capable of absorbing the stresses to which the fiber-optic component is subjected during the placement step and during its normal use. In fact said material prevents the fiber-optic component coming into contact with the walls of the housing (for example of circuit 108 in FIG. 1) and is, moreover, able to hold the fiber-optic component in a position that does not vary significantly during the life of the device, but without transmitting any harmful mechanical stresses to said component.

A preferred embodiment of optical device 100 according to the invention comprises a base 101, shown in detail in FIG. 1, a fiber-optic component 200, housed in base 101, and a cover (not shown) joined to base 101.

The fiber-optic component 200 comprises an optical fiber that has an initial section 201 followed by a central portion where there is a chirped grating 202 which extends over almost the whole of its length, and a final section 203.

Base 101, of substantially rectangular external shape, and with an opening in its central part, comprises semicircular peripheral notches 102, for "dovetailing" with external elements, two input openings 103 and two optional output openings 104 arranged at the corners of base 101.

Base 101 supports the fiber-optic component 200 and protects it from external mechanical stresses, therefore it is sufficiently rigid to offer adequate resistance to the action of external mechanical forces tending to deform it.

Advantageously, base 101 is an almost monolithic element made of materials with high dimensional stability, for example polycarbonate, preferably filled with glass fibers (e.g. to 40%), glass-filled nylon (e.g. nylon 66), or aluminium and its (super) light alloys (e.g. Avional, Ergal, Peraluman). In addition, base 101 is provided with holes 105 and holes 106 used respectively for the passage of fixing screws of the container to an external surface and as indicators for centring the cover.

Each input opening 103 is connected, via a connecting groove 107, to a housing circuit 108 for the fiber-optic component 200, made in base 101. This housing circuit 108 is preferably made by milling base 101. The connecting groove 107 comprises a recess 110 suitable for containing materials for fixing the initial section 201 of fiber-optic component 200, for example rubber, plastic or glue.

Housing circuit 108 comprises a path for fiber-optic component 200 and is delimited by curved fins 109. In FIG. 1 there are two opposite groups of curved fins 109 and two separation zones 114 between these groups. In each of the two groups, the curved fins 109 are arranged along concentric circumferences of increasing radius.

In particular, the housing circuit 108 for fiber-optic component 200 shown in FIG. 1 is able to house said component following a spiral profile.

Preferably, the distance between adjacent fins 109 is a little greater than the maximum diameter of fiber-optic component 200 so that it can be housed without exerting pressure on its walls and, at the same time, its mobility within the housing circuit 108 can be reduced.

When output 104 is provided, base 101 comprises a groove 111 connected to said output. This groove 111 is also connected to the housing circuit 108 and, in the part next to opening 104, it is raised relative to the plane of the housing circuit 108.

Figure 2:
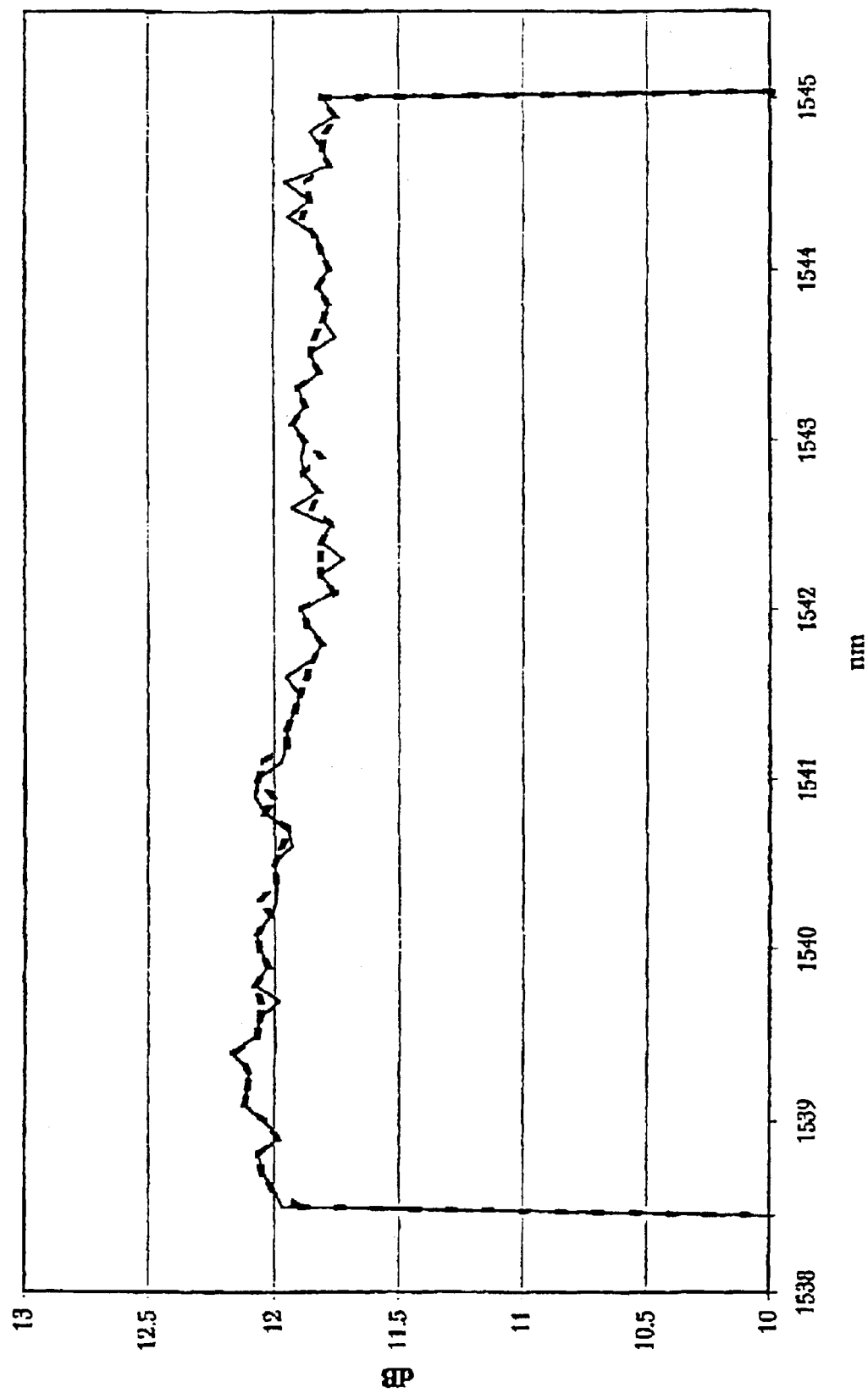
FIG. 2 shows the reflectivity spectra of a chirped grating extended on a test bench and housed in the device of the invention.

In this terminal part, each groove 111 comprises pockets 112, for containing, if necessary, glue or some other conventional material for locking the end 203 of fiber-optic component 200 in the case when this end goes out of the device, as shown in FIG. 2, and protuberances 113 which constitute bases for supporting the cover. The cover is typically made of semirigid plastic material e.g. polycarbonate with thickness preferably of 0.7 mm which also functions as a label as it can easily be printed on by the silk-screen process. It is also possible to use covers made of stainless steel sheet of 0.3 mm. According to a preferred embodiment of the optical device shown in FIG. 1, the chirped grating 202 is of the DCG type (dispersion compensating grating), used for compensating chromatic dispersion. A chirped grating of the DCG type is for example produced by the applicant.

Optical device 100 is suitable for housing optical components of any length, preferably between about 10 cm and about 20 m, and even more preferably between about 20 cm and about 20 m. In particular, a fiber chirped grating housed in said device will preferably have a length greater than 10 cm. More preferably, said length is greater than 20 cm and typically not greater than 10 m. According to a preferred embodiment, the length of chirped grating 202 is about 2 m. In this last case the fiber-optic component 200 has an overall length of about 3.4 m, the end portions 201 and 203 each having a length of about 70 cm.

The middle portion 202 of fiber-optic component 200 can comprise one or more fibers in which a chirped grating has been inscribed, said fibers being connected optically by one of the known welding techniques.

Preferably, the cylindrical casing (also called "tube") for protecting the weld, which has a reduced occupied space, is made by conventional techniques that use, for example, a heat-shrink tube, such as that marketed by OPTOTEC S.p.A. (Italy).

The final section 203 of fiber-optic component 200 can be provided with antireflective termination, obtained by known techniques such as tapering, antireflective coating, and the like.

As shown in FIG. 1, fiber-optic component 200 is placed accurately between fins 109 so as to follow the spiral profile of housing circuit 108. The initial section 201 is inserted via input 103 into connecting groove 107, whereas the chirped grating 202 evolves in housing circuit 108, clockwise, as far as the innermost coil, where the final section 203 is placed. The initial section 201 is bonded to base 101 by a material contained in pocket 110, so as to prevent any axial pull arising from external sections of fiber being transmitted to the internal sections of fiber of the fiber-optic component 200.

This material is, for example, an elastomeric material such as a silicone elastomer according to the present invention, which bonds the initial section 201 to base 101 and at the same time exerts a reduced pressure on the fiber in question, without affecting its optical behaviour. Alternatively, for this specific application, it is possible to use commercial products such as LUXTRAK 4047 or 4057 ABLESTIK (Rancho Dominguez, Calif. 90221).

The spiral along which the fiber-optic component 200 evolves, substantially corresponding to an Archimedes spiral, has a centre of evolution substantially coinciding with the point of intersection of the diagonals of base 101.

The radius of the innermost coil is of a curvature such as will not damage the chirped grating 202 and will not disturb its behaviour.

The distance between the axes of the fiber sections of fiber-optic component 200 arranged along adjacent coils, i.e. the pitch $\Delta R$ of the spiral, is greater than or equal to the maximum diameter of fiber-optic component 200 and is constant for the whole development of the spiral.

For example, a suitable value of the pitch $\Delta R$ is $\Delta R=1.5$ d, where d is the diameter of fiber-optic component 200 comprising the recoating zone. In addition, base 101 is suitable for housing a fiber-optic component 200 in which both ends come out of device 100 so that they are available for external connections.

Housing circuit 108 prevents, in particular, the occurrence of contact between adjacent sections of fiber-optic component 200, whether these sections are in the same plane or are superposed. More generally, housing circuit 108 makes it possible to avoid contact between all the various parts of fiber-optic component 200.

In the regions of housing circuit 108 that do not have fins, fiber-optic component 200 is arranged in such a way that there is no surplus fiber that would occupy the region and come into contact with other sections of fiber.

The curved fins 109 give the fiber-optic component 200 a predetermined profile and in addition separate the sections of fiber corresponding to successive coils.

A spiral profile is particularly advantageous in that, in addition to the advantages set out above, it makes it possible to optimize the overall dimensions of the optical device.

In addition to curved fins 109, it is also possible to make or insert other elements in base 101, capable of imparting a defined profile for placement and/or separation of sections of fiber-optic component 200, in such a way that they do not come into contact.

Other separating elements are, for example, fins of any shape whatever, grooves, crosslinkable resins distributed on base 101 with appropriate geometry, for example in a spiral, or produced by photolithographic processes or a combination of these.

The optical device 100 described is provided with a cover made of a suitable material, applied to base 101, which provides further protection of fiber-optic component 200. Said cover is in particular of the self-adhesive type and adheres to base 101 in those regions not occupied by fiber-optic component 200. It is also possible to use other planar profiles for which the fiber-optic component 200 lies in one plane so that no contact occurs only between defined sections of the component, for example those sections that are more susceptible to changes in the transfer characteristic.

Planar profiles having shapes different from that shown in FIG. 1 may be, for example, curves of a spiral type having non-circular coils and/or coils that are not equispaced.

Moreover, fiber-optic component 200 can be arranged in such a way as to avoid contact through direct superposition between portions of fiber-optic component 200 but to permit some of its parts to be tangent.

The elements that delineate the housing circuit 108 are such as not to produce changes in the behaviour of fiber-optic component 200, for example they do not contain sharp edges and do not impose excessive curvature on said component.

The optical device 100 described is suitable for housing, apart from the chirped grating 202 mentioned above, any other fiber-optic component.

Examples of fiber-optic components that can be housed in a device as indicated in FIG. 1 or 2 are: fiber gratings, active fibers used for amplifying optical signals, fiber couplers, optical fibers in general (such as single-mode fibres, polarization-maintaining fibers, dispersion-shifted fibers, fibers used in optical sensors etc.) as well as components obtained by the optical connection of these. Moreover, the fiber-optic components listed can also comprise sections of purely transmissive optical fiber (such as a single-mode fiber) arranged at the input and/or at the output or in intermediate portions of said component.

The device 100 previously described ensures that the fiber-optic component 200 maintains, during the lifetime of said device, a stable position, i.e. it ensures that the fiber-optic component, over its entire length or for predetermined sections, is not displaced significantly from the initial position inside base 101. In particular, the position of fiber-optic component 200 is kept stable owing to the action of the silicone rubber, whereas the housing circuit 108 has dimensions such as do not permit significant mobility of said component inside it during the placement step.

The aforementioned housing circuit 108 represents a particular fixing element, but other fixing elements are also suitable, such as other types of grooves, containment fins, tubular paths for the fiber, the cover itself, or any other element suitable for the purpose.

Optical device 100 makes it possible to use the fiber-optic component housed within it as a discrete component. For example, optical device 100 can easily be transferred from one container to another without accessing the housed fibre-optic component and thus avoiding repetition of the placement operation which is particularly delicate and requires subsequent characterization, by measuring its transfer function.

Although application of a silicone elastomer according to the invention has been described with special reference to the optical device in FIG. 1, it will be clear to a person skilled in the art, on reading said description, that this silicone elastomer can be used for fixing any optical component in any optical device (for example, in an optical amplifier, an optical repeater, an optical isolator, an optical connector or also in a fiber-optic cable) requiring properties of minimum emission of hydrogen from the fixing material and/or predetermined mechanical properties (in particular moderate hardness) of said material. In particular, both the elastomeric composition and the technique for controlled placement of the optical component can be used advantageously in the assembly of all those optical devices that comprise at least one fiber-optic component that is sensitive to the presence of hydrogen and has at least one portion of fiber with a corresponding transfer function that is liable to change as a result of mechanical stresses. The use of this silicone elastomer is particularly advantageous for fixing, inside a device, a fiber-optic component whose length is such as to require arrangement in a wound-up configuration.

EXAMPLE 1

Preparation of the Silicone Rubber

A first silicone rubber was prepared by mixing the following parts A and B, with the following compositions:

| Part A | | | |
|---|---|---|---|
| Compound | Parts by weight | mmol/g of vinyl groups | Total vinyl groups (mmol) |
| Silopren U1 | 16 | 0.13 | 2.08 |
| Silopren U10 | 16 | 0.05 | 0.8 |
| Silicone oil M100 | 11 | — | — |
| Catalyst | 0.2 | — | — |
| Silica Cab-O-Sil TS610 | 6.8 | — | — |

| Part B | | | |
|---|---|---|---|
| Compound | Parts by weight | mmol/g of —Si—H groups | Total —Si—H groups (mmol) |
| Silopren U230 | 1.0 | 2.3 | 2.3 |
| Silicone oil M100 | 15 | — | — |
| Silicone oil M500 | 26 | — | — |
| Silica Cab-O-Sil TS610 | 8.0 | — | — |

The vinyl-siloxane compounds Silopren U1 and Silopren U10, the hydrogen-siloxane crosslinking agent Silopren U230 and the silicone oils M100 and M500 are marketed by the company Bayer AG. Silica Cab-O-Sil TS610 is marketed by the company Cabot.

The kinematic viscosity of the two parts A and B (and hence of their mixture) is about 1000 mPas at 25° C. (ASTM D445).

Parts A and B are mixed in 1:1 ratio, for which the molar ratio between vinyl groups and hydrogen-siloxane groups is about 1:0.8, thus with slight stoichiometric deficit of the last-mentioned reactive groups. The working times of the fluid mixture are about 15–20 minutes. About one hour after mixing the two components, the composition has a rubbery solid consistency, and final hardness is reached in two-three hours. In the needle penetration test according to standard ASTM D1321, the rubber gives a value of about 470 tenths of mm.

EXAMPLE 2

Preparation of the Silicone Rubber

A second silicone rubber was prepared following the procedure described in Example 1, the only difference being that the parts by weight of compound Silopren U230 in part B of the mixture were 1.25 instead of 1.0. In this way, by mixing part A with part B in 1:1 ratio, the stoichiometric ratio between vinyl groups and hydrogen-siloxane groups is about 1:1. The rubber so obtained displays characteristics similar to those in the example, with a penetration value of about 400 tenths of mm.

EXAMPLE 3

Evolution of Hydrogen Through Ageing of the Rubber 10-gram samples of silicone rubber according to examples 1 and 2 were prepared by distributing a thin layer (about 200 $\mu$m thick) of liquid mixture on the inside surface of a series of test-tubes (internal volume 150 cm$^3$). The test-tubes also contained about 0.1 ml of water (5.5 mmol).

In this way we prepared a first group (G1) of test-tubes of mixture 1:0.8 (vinyl groups:hydrogen-siloxane groups) according to Example 1 and a second group (G2) of test-tubes of 1:1 mixture according to Example 2.

Each of the two groups G1 and G2 was divided into two subgroups, G1a and G1b, and G2a and G2b, respectively. The test-tubes in both subgroups G1a and G2a were sealed immediately after distribution of the liquid mixture on the surface of the test-tubes and the mixture was cured with the test-tube sealed. The mixtures contained in subgroups G1b and G2b were cured with the test-tube open, and the test-tubes were sealed once crosslinking had ended.

On completion of crosslinking, about three hours after deposition of the liquid mixture, the test-tubes containing the silicone rubber were submitted to an ageing test at 100° C. for 15 days in a stove (roughly corresponding to ageing of more than 20 years at a temperature of about 10° C.).

At the end of ageing, the test-tubes were recovered and the composition of the gases evolved inside the test-tubes was analysed using a Hewlett-Packard Model 5480 gas chromatograph to detect any traces of hydrogen.

The results of the ageing test are shown in Table 1.

TABLE 1

| Ageing test | | | |
|---|---|---|---|
| Group | Molar ratio vinyl groups/ H-siloxane groups | Type of sealing | Amount of H$_2$ evolved (average of the group) cm$^3$/kg rubber |
| G1a | 1:0.8 | Immediate | <0.03 |
| G1b | 1:0.8 | After curing | <0.03 |
| G2a | 1:1 | Immediate | <0.05 |

TABLE 1-continued

Ageing test

| Group | Molar ratio vinyl groups/ H-siloxane groups | Type of sealing | Amount of $H_2$ evolved (average of the group) $cm^3$/kg rubber |
|---|---|---|---|
| G2b | 1:1 | After curing | <0.03 |

As can be seen from the data in Table 1, even in the most severe conditions of group G2a the evolution of hydrogen remained well below the limits indicated as acceptable of 1 $cm^3$/kg and preferably of 0.5 $cm^3$/kg.

EXAMPLE 4 (COMPARATIVE)

Evolution of Hydrogen Through Ageing of a Rubber Cured According to the Known Technology A silicone rubber for comparison was prepared according to Example 2, but using a ratio of 1.5:1 of ≡SiH groups to vinyl groups (i.e. 4.32 parts by weight of compound Silopren U230 in the total composition). In an ageing test on this comparative composition, effected in accordance with the procedure described in Example 3, the amount of hydrogen evolved (measured in the test-tube sealed after curing) was greater than 100 $cm^3$/kg of material.

EXAMPLE 5

Measurements of Reflectivity of Chirped Gratings

Experiments were carried out by measuring the reflection spectrum of a fiber chirped grating before and after placing it in a container such as that described with reference to optical device 100.

5a. Measurement of Reflectivity of a Rectilinear Chirped Grating

A first evaluation of the reflectivity of a fiber chirped grating was effected by carefully placing a chirped grating with length of 1.5 m on a bench in an almost rectilinear position.

One end of the fiber chirped grating was connected to a first port of a conventional coupler. A second port of this coupler was suitably connected to a wide-spectrum optical source while a third port was connected to spectrum analyser suitable for measuring the spectrum of the signal reflected by the chirped grating.

The other end of the optical fiber, in which the chirped grating was inscribed, was cut in such a way that the end surface was suitably inclined relative to the optical axis of said fiber, typically with an inclination of 7°–8°, to prevent reflections. To reduce any residual reflections this end was immersed in an optical oil that had a refractive index n equal to that of the fiber core (n≅1.46).

FIG. 2 shows, as a dashed line, the reflectivity spectrum of the chirped grating, i.e. the absolute value of the ratio, expressed in decibels, between the reflected power and the transmitted power in relation to the wavelength.

In the reflectivity graph shown in FIG. 2, the value shown on the ordinate also takes account of the losses introduced by the measurement set-up. These graphs are meaningful for evaluating the variation in reflectivity with change of wavelength, but not for the absolute value of reflectivity.

5b. Measurement of Reflectivity of a Chirped Grating Housed in a Device According to the Invention A base 101 (as shown in FIG. 1) was made from reinforced polycarbonate with the dimension 1.2 cm×12 cm, the housing circuit 118 with spiral profile being obtained by milling.

The fiber chirped grating of Example 4a was placed according to the method previously described with reference to optical device 100, by placing the optical device in the respective housings, covering it with a mixture made according to Example 1 and leaving the silicone rubber to cure for about two hours.

The measured reflectivity spectrum of the chirped grating placed in base 101 is shown as a solid line in FIG. 2.

All the deviations between the points of the spectrum of the chirped grating placed in base 101 and embedded in the silicone rubber, and those of the stretched-out chirped grating are less than 0.5 dB, and in particular are less than 0.2 db. These experiments have shown that optical device 100 makes it possible to protect the fiber-optic component 200 without substantial changes in transfer function.

What is claimed is:

1. A method for fixing an optical component arranged inside a housing, comprising the steps of:
   arranging said optical component inside said housing;
   embedding said optical component in a polymer composition based on polysiloxanes; and
   crosslinking said polymer composition, to obtain a crosslinked silicone elastomer capable of fixing the said component;
   wherein said composition is a mixture comprising at least one polysiloxane containing at least two hydrogen-siloxane functional groups of formula >SiH—O—, at least one polysiloxane containing at least two vinyl groups of formula —CH=$CH_2$, and a catalyst, said polysiloxanes being reacted in an amount such that the molar ratio between the hydrogen-siloxane groups and the vinyl groups is less than or equal to 1:1; and
   said silicone elastomer evolves a quantity of hydrogen less than about 1 $cm^3$/kg of elastomer, when submitted to thermal ageing for 15 days at 100° C.

2. The method according to claim 1, wherein said polymer composition based on polysiloxanes has a viscosity between about 2000 mPas and about 500 mPas prior to crosslinking.

3. The method according to claim 1, wherein said silicone elastomer has a needle penetration value according to standard ASTM D1321 between about 300 tenths of a millimeter and about 600 tenths of a millimeter.

4. An optical device comprising
   at least one fiber-optic component;
   a housing capable of containing the said fiber-optic component; and
   a polymer composition capable of holding the said optical component in a predetermined position inside said housing and of protecting said component against mechanical stresses;
   wherein said polymer composition comprises a silicone rubber obtained by crosslinking a mixture comprising at least one polysiloxane containing at least two hydrogen-siloxane functional groups of formula >SiH—O—, at least one polysiloxane containing at least two vinyl groups of formula —CH=$CH_2$, and a catalyst, said polysiloxane being reacted in an amount such that the molar ratio between the hydrogen-siloxane groups and the vinyl groups is less than or equal to 1:1; and
   said rubber evolves a quantity of hydrogen less than about 1 $cm^3$/kg of rubber as a result of thermal ageing for 15 days at 100° C.

5. The optical device according to claim 4, wherein said silicone rubber has a needle penetration value according to standard ASTM D1321 between about 300 tenths of mm and about 600 tenths of mm.

6. The optical device according to claim 4, wherein the viscosity of the polymer composition before crosslinking is between about 500 mPas and about 2000 mPas at 25° C.

7. An elastomeric composition based on a polysiloxane obtained by crosslinking a mixture comprising:

(a) at least one polysiloxane containing at least two hydrogen-siloxane functional groups of formula >SiH—O—;

(b) at least one polysiloxane containing at least two vinyl groups of formula —CH=CH$_2$,
wherein one of said at least one polysiloxanes is of formula (II)

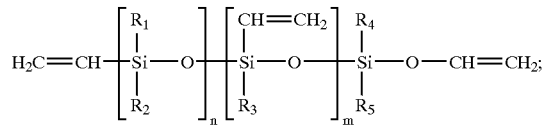

(II)

where $R_1$, $R_2$, $R_3$, $R_4$, and $R_5$ are, each independently, a ($C_1$–$C_4$) alkyl group, a ($C_5$–$C_8$) cycloalkyl group or a phenyl group, n is an integer between about 200 and about 1200 and m is an integer between 1 and 5; and (c) at least one catalyst;

wherein said polysiloxanes are reacted in an amount such that the molar ratio between the hydrogen-siloxane groups and the vinyl groups is less than or equal to 1:1.

8. The elastomeric composition according to claim 7, wherein the ratio between the molar quantity of hydrogen-siloxane groups and the molar quantity of vinyl groups is between about 1:1 and about 0.5:1.

9. The elastomeric composition according to claim 7, wherein the polysiloxane containing hydrogen-siloxane groups is a compound of formula (I):

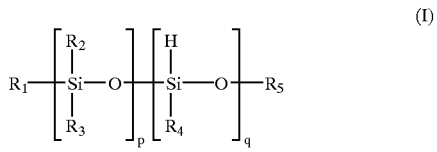

(I)

where $R_1$, $R_2$, $R_3$, $R_4$, and $R_5$ are, each independently, a ($C_1$–$C_4$) alkyl group, a ($C_5$–$C_8$) cycloalkyl group or a phenyl group, p is an integer between about 30 and about 200 and q is an integer between about 5 and about 40.

10. The elastomeric composition according to claim 7, wherein the composition additionally comprises a silicone oil.

11. The elastomeric composition according to claim 7, wherein the composition additionally comprises silica.

* * * * *